March 8, 1966     I. M. BORISH     3,238,676
METHOD FOR ALTERING THE POWER OF A CORNEAL CONTACT LENS
Filed Dec. 31, 1962     3 Sheets-Sheet 1
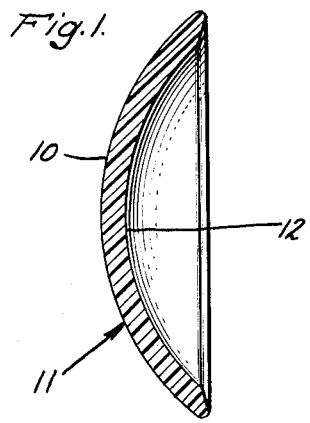
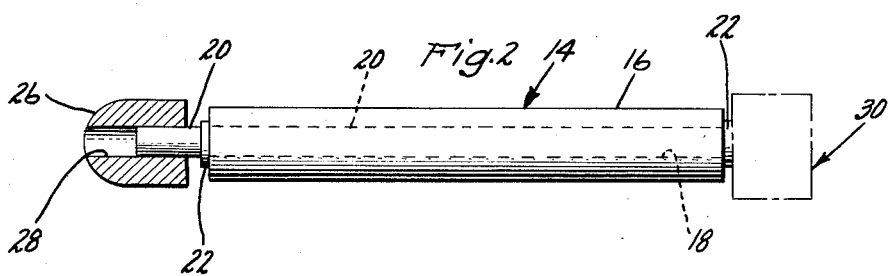
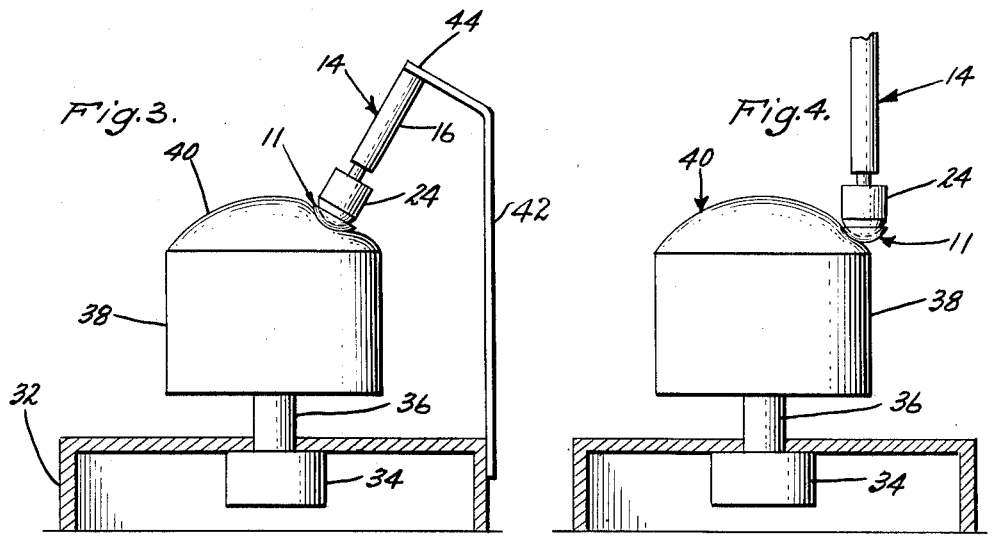
INVENTOR.
Irvin M. Borish,
by Hood, Just & Irish
Attorneys.

March 8, 1966          I. M. BORISH          3,238,676
METHOD FOR ALTERING THE POWER OF A CORNEAL CONTACT LENS
Filed Dec. 31, 1962          3 Sheets-Sheet 2
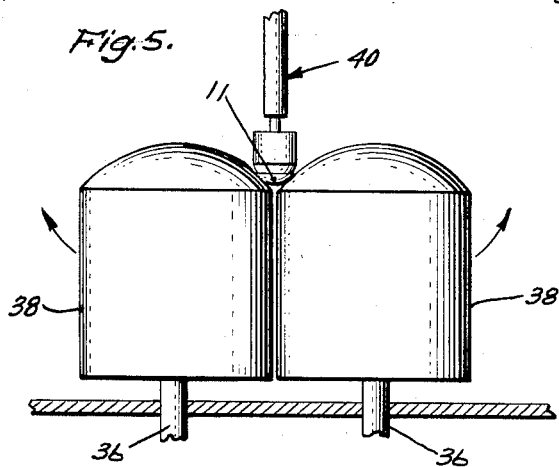
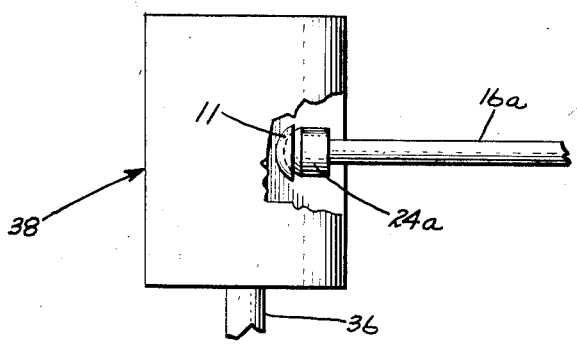
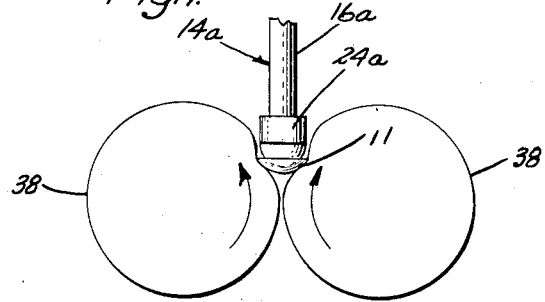
INVENTOR.
Irvin M. Borish,
by Hood, Just & Dish
Attorneys.

March 8, 1966  I. M. BORISH  3,238,676
METHOD FOR ALTERING THE POWER OF A CORNEAL CONTACT LENS
Filed Dec. 31, 1962  3 Sheets-Sheet 3
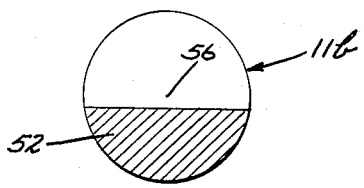
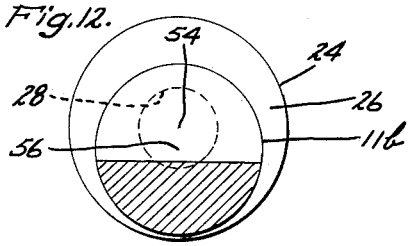
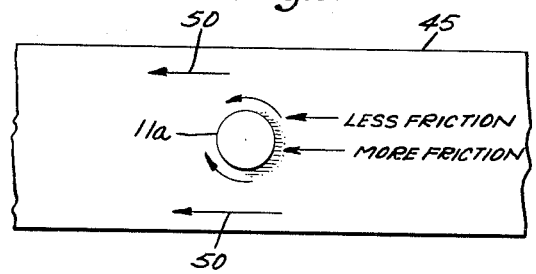
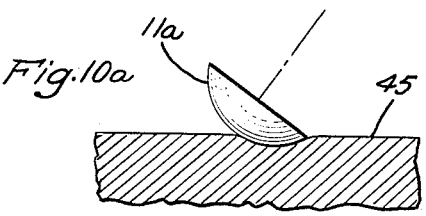
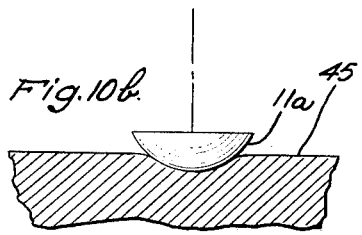
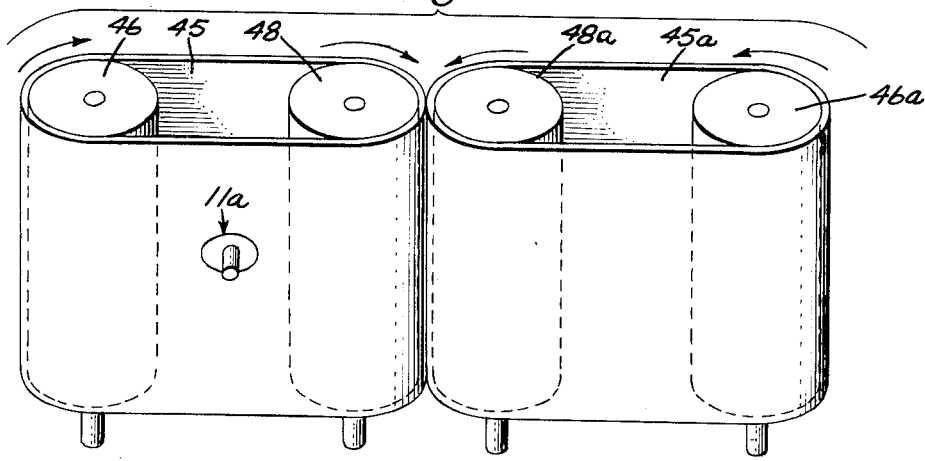
INVENTOR.
Irvin M. Borish,
by Hood, Gust & Dish
Attorneys.

United States Patent Office 3,238,676
Patented Mar. 8, 1966

3,238,676
METHOD FOR ALTERING THE POWER OF A CORNEAL CONTACT LENS
Irvin M. Borish, Kokomo, Ind., assignor to Indiana Contact Lens, Inc., Marion, Ind., a corporation of Indiana
Filed Dec. 31, 1962, Ser. No. 248,732
8 Claims. (Cl. 51—284)

The present invention relates to a method for altering the power of a corneal contact lens, and more particularly to a method whereby the power of a corneal contact lens may be altered in a more facile, efficient and simple manner.

In making plastic contact lenses of the so-called "corneal type" or changing the power thereof, one or more of the operations of cutting, grinding and polishing are performed. These operations are performed for the purpose of giving the corneal lens a desired power, or the required power, as may be prescribed by a physician or an optometrist. In general, every contact lens is provided with a different power and the curvature to which the front corneal surface must be developed to provide the necessary power is calculated in advance of the operations on the lens.

Generally speaking, a lens is fabricated by first forming a blank, mounting this blank in a cutting machine for rotating the same while a substantially spherical front surface is cut thereon. This cutting operation leaves tool marks and a translucent or frosted appearance on the lens, and this is corrected by a buffing or polishing operation until the lens becomes optically clear and transparent. Any suitable buffing or polishing compound may be used for this purpose, examples being rouge, fine emery paper, and various oxides of tin, aluminum and the like.

Plastic lenses may also be made by injection molding or by indenting a suitable flat sheet of plastic by means of curved tools or dies under heat and pressure.

The aforesaid cutting operations are performed on a lathe which requires different settings for different curves. The polishing may be performed by means of tools having pitch surfaces which conform to the curvature of the lens blank as cut on the lathe. Also the polishing may be accomplished by specially precurved tools.

The particular curvature of the front surface of the lens is determined primarily by adjustment of the lathe which needs to be reset each time a different curvature is to be formed. The polishing tools if of the precurved type must be changed for different lens curvatures. If the polishing tool is of the pitch type, it must be conformed to the desired curvature before the polishing is started. It is obvious that time and effort are consumed in setting up the polishing apparatus each time a differently curved lens is to be polished.

The present invention is concerned primarily with the problem of altering the front lens surface as well as forming precisely the power of the lens, and provides precision control as well as ease and simplicity of operation whereby a savings in fabricating and fitting expense may be realized.

It is, therefore, an object of this invention to provide a method for altering the power of a corneal contact lens in a more facile, efficient and simple manner.

It is another object to provide a method for either adding cylindrical power to a lens or for altering such cylindrical power in predetermined controlled and measurable amounts.

Other objects will become apparent as the description proceeds.

The above-mentioned and other features and objects of this invention and the manner of attaining them will become more apparent and the invention itself will be best understood by reference to the following description of an embodiment of the invention taken in conjunction with accompanying drawings, wherein:

FIG. 1 is a cross-sectional illustration of a typical corneal contact lens;

FIG. 2 is a side view, partly sectioned, of one portion of the apparatus of this invention whereby a lens or lens blank may be mounted for rotation;

FIG. 3 is a side view, partly sectioned, of an embodiment of this invention, a lens or lens blank being shown in position for having a flatter curvature formed on the front surface thereof;

FIG. 4 is a side view similar to that of FIG. 3 but with the elements thereof being so positioned as to form a more convex curvature on the lens surface;

FIG. 5 is a fragmentary side view, partly sectioned, of a different embodiment of this invention;

FIG. 6 is an end view, partially broken away for clarity of illustration, of still another embodiment of this invention;

FIG. 7 is a top plan view of the arrangement of FIG. 6;

FIG. 8 is a perspective illustration of still another embodiment of this invention;

FIG. 9 is a plan view in fragmentary form of an endless belt or the like of the character shown in FIG. 8 and with a lens blank shown in diagrammatic form superimposed thereon;

FIGS. 10a and 10b are diagrammatic illustrations used for the purpose of explaining the principles of the apparatuses and methods of this invention;

FIG. 11 is a front view of a typical corneal lens blank masked preparatory to having one portion thereof altered in power in connection with fabricating a bifocal lens; and FIG. 12 is an illustration of the same lens of FIG. 11 properly mounted on the supporting face of a spinner used in the apparatus of the preceding figures.

Referring to the drawings, and more particularly to FIG. 1, the corneal contact lens 11 there illustrated is quite conventional with the material thereof preferably being plastic. The plastic which is used is chemically inert, a suitable plastic being methyl methacrylate. The thickness dimension of the lens 11 is also conventional of, say, between 0.15 and 0.2 millimeter. The outside diameter of the lens is made slightly less than the outline of the corneal surface. The front or outer surface 10 of the lens may have any suitable curvature, depending upon the optical power desired, while the inner or rear surface 12 is conventionally given the same, more, or less curvature than the outer surface of the corneal or optic cap on which it is to be mounted.

Briefly stated, the present invention relates to the changing of the curvature of the surface 10 for the purpose of changing the power of the lens.

In FIG. 2 is illustrated a lens-supporting device which is generally indicated by the reference numeral 14. This supporting device includes a stationary, elongated, substantially rigid handle 16 which is provided with a suitable, cylindrically shaped longitudinal bore 18. A shaft 20 is rotatably received by the bore 18 and is provided with retaining shoulders or washers 22 at opposite end portions thereof which contact the opposite ends, respectively, of the handle 16 for holding the shaft 20 against relative axial movement.

On the left-hand end of the shaft 20 is frictionally or otherwise securely fitted a lens holder or spinner 24 having an end surface 26 which is spherically convex or otherwise suitably shaped to receive in intimate supporting engagement the inner concave surface 12 of a lens 11.

The holder 24 may be provided with an axial aperture 28 as shown for a purpose which will become apparent from the following description.

The device 14 just described permits the spinner 24 and its supporting shaft 20 to rotate within the handle 16 which may be held either in the hand or mounted on a suitably rigid frame structure as will be later described.

In one different arrangement of this invention, it may be desirable to spin the holder 24 while the handle 16 is being held stationary. This may be accomplished simply by mounting a suitable electric motor or the like 30 on the handle 16 and connecting the rotor of the motor to the right-hand end of the shaft 20. By this means, the shaft 20 as well as the holder 24 may be rotated. As will appear from the following description, the motor 30 is not required, but may be used if the operator so desires.

Referring next to FIGS. 3 and 4, a supporting frame or chassis 32 has a suitable electric motor 34 securely mounted thereon with the rotor shaft being suitably connected to an upright spindle 36. Mounted on or carried by this spindle 36 is a polishing cylinder 38, the axis of this cylinder being arranged to coincide with the axis of the spindle 36. The upper end 40 of this cylinder 38 may be curved outwardly or upwardly as shown, and in one practical embodiment of this invention is spherically convex.

The cylinder 38 is unique in the respect that it is resiliently deformable. In order to obtain this desired deformability, it may be fabricated of any one of a variety of different materials such as sponge rubber or plastic, felt, woolen or veleveteen materials, or any other suitable material which will resiliently deform or indent in a manner as will be explained in full detail in the following. The cylinder may be composed of a core of metal or similar hard material which carries on the outer surface thereof a suitable thickness of any one of the foregoing materials whereby the resiliently deformable characteristics may be obtained.

In one embodiment of this invention, a rigid, upright frame member 42 is fixedly secured to the side of the chassis 32 as shown and is provided with an upper end portion 44 which may be fixedly attached to the distal end of the handle 16. This upper end portion 44 as well as the handle 16 are so related as to position the lens-holding device 14 as shown. As will appear to a person skilled in the art, the use of the frame member 42 is optional and may be eliminated if the operator of the apparatus should desire to hold the handle 14 in his hand.

A lens or lens blank of the shape shown in FIG. 1 is first mounted on the surface 26 of the spinner 24. In order to secure the lens in place, a suitable, conventional pressure-sensitive adhesive may be first applied to either the concave surface 12 of the lens or the convex surface 26 of the spinner. Any other suitable material such as pitch, double-sided adhesive tape, vacuum suction and the like may be used for mounting the lens in place, the only requirement being that the adhesive be such that the inner surface of the lens will not be damaged and, furthermore, the lens will be held in place securely on the spinner for the power-altering operation which is to be performed.

With the lens element 11 mounted on the surface 26 with the optical axis of the lens element substantially coinciding with the axis of rotation of the spinner 24, the lens-holding device 14 is arranged such as to impress the central portion of the lens surface 10 into the convex surface 40 in a region diametrally within the perimeter of the surface 40. In other words, the spinner axis of rotation (as well as the optical axis of the lens) are positioned perpendicular, or substantially perpendicular, to the surface 40 in the region of contact therewith. The lens 11 is impressed or indented into the deformable surface 40 such that the outer peripheral margin thereof does not contact the surface 40. On the other hand, as will appear from the following, the lens may be forced into the surface 40 sufficiently far to provide minimal contact between the outer peripheral portion of the surface 10 and the surface 40.

Being so positioned, the surface 40, or more accurately the material backing the surface 40, reacts with more force against the central portion of the lens surface 10 than the outer peripheral margins thereof.

A suitable polishing compound such as rouge, powder, aluminum oxide or the like, in a conventional liquid vehicle, is applied to the surface 40 and may be continually supplied thereto as needed. The motor 34 is energized to set the cylinder 38 into rotation. This results in flattening or otherwise increasing the radius of curvature of the front lens surface 10, the degree of this change depending upon the period of time the lens is held against the surface 40. The reason for this curvature change is the polishing action which removes more plastic from the central portion of the lens surface with progressively decreasing amounts radially outwardly therefrom in a uniformly varying manner. While the lens 11 is so engaged with the rotating surface 40, the lens as well as its spinner 24 rotate so that uniform spherical alteration is achieved thereby avoiding any aberrative or cylindrical resultants. Rotation of the spinner 24 results from the frictional contact between the lens surface 10 and the polishing surface 40. A certain slippage between these surfaces continually occurs whereby a uniform, rotational polishing action changes the front surface curvature.

After the polishing action has been carried on for a period of time which, from experience, is indicative of an approximate change in surface curvature, the operator removes the lens 11 from the spinner 24 or the spinner 24 from the shaft 20 and measures the optical power thereof to determine whether or not any further curvature changes are needed. If they are, the foregoing process is repeated one or more times until the power desired is achieved.

Up to this point, the flattening of surface curvature has been explained. Since the requirement of increasing curvature must also be satisfied, reference is made to FIG. 4 in this connection. As will be there noted, the holder 14 is changed in position such that the lens 11 is brought into engagement with the surface 40 near the outer perimeter of the latter. Also, the holder 14 is positioned such that the lens surface 10 is engaged with the polishing surface 40 in a region which extends from the outer perimeter of the surface 10 radially inwardly to a region just short of the lens axis or just beyond the same. In other words, the lens is impressed into the surface 40 in such a manner that the reactive polishing forces are greater at the lens periphery than they are at the lens center. Also, these reactionary forces should vary uniformly in a progressively decreasing manner from the outer periphery inwardly toward the lens center.

By again rotating the cylinder 38 with suitable polishing compound on the surface 40, the plastic in the outer peripheral regions is removed in greater amount than that toward the center. This results in increasing the curvature of the surface, or in other words making it more convex. In this mode of operation, the lens is again rotated by action of the spinning or rotating polishing material whereby uniform alteration in the lens power is achieved without aberration.

Thus, by following the procedure outlined in the foregoing in connection with FIG. 3, lens power in the direction of decreasing surface curvature is achieved, while following the procedure outlined in connection with FIG. 4, a power change of increased curvature is obtained.

Referring to FIG. 5, like numerals indicate like parts. Instead of using only a single cylinder 38, two such cylinders mounted in parallelism and contiguity are used. Suitable driving means, such as motors, are attached to the spindles 36 and operated such as to rotate the cylinders 38 in opposite circumferential directions as indicated by the two arrows. This particular arrangement is especially useful in increasing the convexity of the lens surface by merely impressing the lens into adjacent portions of the two surfaces 40 with the axis of the spinner 24 being held substantially parallel to the cylinder axes and midway therebetween. In other words, the axis of the spinner 24 preferably passes between the adjacent portions of the two cylinders 38.

Following the same polishing procedures and using the same compounds as previously explained in connection with FIGS. 3 and 4, the outer peripheral portions of the lens surface must be affected more than the central portions thereof and in a uniform manner. The convex power of the front surface is thereby increased. The use of these two cylinders 38 may be preferred over the single cylinder of FIG. 4 inasmuch as in some instances it permits more uniform control of the curvature change. In making the front surface more convex, the contacted portions of the two surfaces 40 react with more force against the outer peripheral portions of the lens surface than they do against the innermost portions. Also as was explained in connection with FIGS. 3 and 4, the lens 11 and its spinner 24 will rotate such that the curvature change on the lens will be spherically uniform and free from aberration.

In FIGS. 6 and 7 are illustrated a slightly different concept of this invention which is particularly useful in grinding or forming optical cylinders on the front surfaces of contact lenses. The apparatus there disclosed may be identical to that in FIG. 5 with the exception that the upper surface 40 is not needed. Two cylinders 38 (FIG. 7) are mounted side-by-side as is true for the apparatus of FIG. 5 with the cylinders 38 being resiliently deformable as previously explained. One primary difference resides in the fact that the spinner 24a is not rotatable and in this connection is securely fixed to the stationary handle 16a. Suitable driving mechanism attached to the spindles of the two cylinders 38 rotate the latter in opposite directions as shown by the arrows in FIG. 7, and the cylinders are positioned as closely together as possible.

In operation, the lens 11 is mounted on the holder 24a the same as in the preceding arrangements. The handle 16a is so manipulated as to apply the lens 11 against both cylindrical surfaces of the two cylinders 38. Preferably, the lens or optical axis (which coincides with the longitudinal axis of handle 16a) is held perpendicular to the plane of the cylinder 38 axes and passes midway between the two cylinder surfaces.

These two surfaces are moving in a direction against the front surface of the lens, and the latter is impressed thereinto to an extent such that the center of the lens lies in the gap between the two surfaces and the edges of the lens forcefully engage the latter. By this means, the opposite, diametral edge portions of the lens receives the maximum polishing effect. Since the lens is not rotated, the polishing is maximum in one meridian of the lens. A cylinder is thereby formed upon the lens equator. This is a convex cylinder and its optical axis lies parallel to the direction of the axes of the cylinders 38. By marking the desired axis on the lens and its fixed holder, and holding this mark parallel with the axes of rotation of the polishing surfaces, the axis of the optical cylinder becomes predictable. Obviously, the operator must cease the polishing action when the correct power has been achieved. While in the foregoing the polishing wheels have been shown and described as being cylindrical in shape, it will be apparent that these shapes can change without departing from the spirit and scope of this invention. For example, the arrangement shown in FIG. 8 differs in the respect that two endless belts 45 and 45a are operatively positioned adjacent to each other and are held in this position by means of suitably spaced apart rollers 46a, 48a, and 46, 48. The axes of these rollers are parallel, and the driving mechanism attached to the rollers is operated such as to move the belts 45 and 45a in opposite directions. The two rollers 48 and 48a which are upright and parallel are mounted as closely together as possible, thereby approximating the arrangements of FIGS. 5, 6 and 7. The rollers 46, 48 and 46a, 48a may be fabricated of the same resiliently deformable material previously described, and the endless bands 45, 45a may consist of some suitable pliable cloth material, such as cotton, wool and the like. On the other hand, the rollers may be fabricated of metal or the like with the endless bands 45, 45a being of a relatively thick material which is resiliently deformable. For example, the material in this latter instance could be sponge rubber in sufficient thickness to provide the resilient deformation previously described.

A lens power is polished by the use of this apparatus by following the same methods and techniques previously described in connection with FIGS. 3–7. However, a slightly different polishing action and technique is possible by using that portion of one of the bands 45, 45a which is located between the two respective supporting rollers. In the region between these two rollers, the endless bands, of course, will be flexible and resiliently deformable. By impressing the lens 11a (FIG. 8) perpendicularly against the surface of the band 45, this impression being shown diagrammatically in FIG. 10b, the front curvature of the lens can be flattened the same as before. If it is desired to increase the convexity of the lens surface, the lens is held by means of its supporting device 14 at an acute angle with respect to the band surface as indicated diagrammatically in FIG. 10a. The lens quite obviously must be held such that movement of the band 45 will cause the lens to rotate so as to avoid producing any aberrative effects.

As shown diagrammatically in FIG. 9, with the band 45 moving in the direction of the arrows 50, and the lens 11a impressed perpendicularly thereinto as shown, the latter will be caused to rotate in one direction or the other depending upon the magnitude of the frictional moments imparted to the lens. In other words, if the friction between the lens surface and the band 45 should be greater in the lower radial region of the lens than in the upper region (as shown in FIG. 9), the lens 11a will be rotated clockwise. If the converse occurs, then the lens 11a will be rotated counterclockwise. This rotation, of course, is desired in order to provide uniform curvature changes and to avoid aberrative effects.

With reference to FIGS. 11 and 12, one method of producing a bifocal, corneal contact lens will be described. With reference to FIG. 11, the lens 11b is initially completed in single vision form in accordance with the techniques previously described and may be provided with any cylindrical power desired. The lens may either consist of distant correction in single vision form or of near correction. If it is the distance correction, the bifocal is added by the method of adding more convex power to the distant power in a portion of the lens. If it is in near correction form, the bifocal segment is created by adding concave power to the near power in a portion of the lens.

In any event, the portion of the lens which is not to be altered in power is protected from the polishing devices by means of a mask which may be of any suitable material such as tape of Teflon, plastic, and the like. Whatever masking material or tape is used, it is important that it not be unduly altered by the polishing action nor be so thick as to produce any irregularities between the lens surface and the tape edge as a result of the polishing action which is to follow. Also, the tape should not be so fragile as to tear away while being polished.

If in FIG. 11 it is assumed that the lens has previously been polished to a suitable near-vision power, the lower segment thereof is covered by means of Teflon tape 52 as shown. The lens 11b is thereupon mounted on the surface 26 of the spinner 24 such that the axis 54 of rotation of the spinner intersects the central region of the unmasked portion of the lens. In other words, the spinner axis 54 is offset radially from the center 56 of the lens itself. Following the mounting of the lens element 11b in this manner (FIG. 12), the power desired in the unmasked segment is polished in as previously explained by either increasing or reducing the convexity of this particular segment.

In the foregoing, the alteration of the lens power has been explained as being effected by means of a polishing surface which moves and a lens holder which is held stationary but is rotatable. This method and apparatus may be reversed to the extent such that the polishing surface may remain stationary and the lens spinner 24 may be rotated. This is graphically illustrated in FIGS. 10a and 10b wherein the surface 45 may be considered as being stationary and the lens element 11a as being rotated by a rotatable spinner 24. Rotation of the spinner 24 is simply accomplished by means of a motor 30 (FIG. 2) or some similar rotating drive which is attached to the shaft 20 whereby the spinner 24 may be rotated. This results in rotation of the lens element 11 or 11a against the stationary, resiliently deformable polishing surface whereby the same changes as previously mentioned in the lens power may be effected. For example, if it is desired to flatten the curvature, the spinning lens is brought to bear against the stationary, resiliently deformable surface 45 in the position shown in FIG. 10b. If it is desired to increase the curvature or convexity of the lens surface, the spinning lens 11a is brought into engagement with the deformable surface 45 much as shown in FIG. 10a.

In the overall consideration of the apparatuses and techniques explained in the foregoing, it will now be recognized that the polishing action and power alteration achieved is accomplished by reason of the fact that the surface against which the lens is impressed is flatter than the curvature of the lens itself. As shown in FIGS. 3, 4 and 5, the surfaces 40 have a larger radius of curvature than does the surface 10 of the lens element. In FIGS. 6 and 7, it is evident that the radius of curvature of the cylinders is much larger than that of the lens surface 10. In FIGS. 8, 9, 10a and 11b, the polishing surfaces may indeed be flat.

With the cylinder 38 in FIGS. 3 and 4 having a radius of 3/4 inch and the surface 40 having an approximate radius of 3/4 inch, rotation of the cylinder 38 at a rate of 1200 r.p.m. requires from between 5 to 10 seconds touching of the lens to the polishing surface in order to make a noticeable power change in the lens. By experience, the operator can determine beforehand the approximate force and time required within which to obtain a given power change.

It can thus be seen that the alteration of lens power can be obtained in an extremely facile and expeditious manner through and by means of apparatus which is the ultimate in simplicity.

While I have described above the principles of my invention in connection with specific apparatus, it is to be clearly understood that this description is made only by way of example and not as a limitation to the scope of my invention.

What is claimed is:

1. The method of forming a cylinder on a corneal contact lens having a convex external surface comprising the steps of moving two adjacent cylindrically curved polishing surfaces in opposite angular direction about two spaced apart and substantially parallel stationary axes, said surfaces being resiliently deformable, and impressing the convex external surface of a contact lens into adjacent portions of both polishing surfaces simultaneously while holding said lens against rotation and in a position with the optical axis thereof substantially normal to a plane including said axes and further with said optical axis passing between said surfaces.

2. The method of claim 1 wherein said moving surfaces are on two contiguous cylinders rotated about respective parallel axes.

3. The method of claim 1 wherein said moving surfaces are on two contiguous endless belts which are mounted on cylindrical supports rotatable about parallel axes respectively.

4. The method of forming a cylinder on a corneal contact lens having a convex external surface comprising the steps of moving two adjacent cylindrically curved polishing surfaces in opposite angular directions about two spaced apart and substantially parallel axes, said surfaces being resiliently deformable and impressing the convex external surface of a contact lens into portions of both polishing surfaces simultaneously while holding said lens in a given position with the optical axis thereof substantially normal to a plane including said axes.

5. The method of forming a cylinder on a corneal contact lens having a convex external surface comprising the steps of rotating two adjacent cylinders in opposite directions, the axes of said cylinders being stationary and parallel, said axes defining a plane, the peripheral surfaces of said cylinders being resiliently deformable and provided with a polishing material, impressing the convex surface of a contact lens into adjacent portions simultaneously of said surfaces while holding said lens against rotation such that opposite diametral portions of said convex surface are in engagement with said adjacent portions respectively, the position of said lens while being so impressed being such that the optical axis thereof is substantially normal to said plane and passes between said surfaces, and holding said lens in such position until a cylinder is formed on the convex surface thereof.

6. The method of claim 5 wherein the central portion of the convex surfaces lies in the gap between the two surfaces and the latter move in a direction toward and against said convex surface.

7. The method of forming a cylinder on a corneal contact lens having a convex external surface comprising the steps of moving two curved surfaces about parallel spaced apart axes in opposite angular directions, the curvature of said surfaces being in a plane at right angles to the plane including said axes, said surfaces being straight in the last-mentioned plane, said surfaces being adjacent to each other, said axes being stationary and the material of said surfaces being resiliently deformable, impressing the convex surface of a contact lens into adjacent portions simultaneously of said surfaces while holding said lens against rotation such that opposite diametral portions of said convex surface are in engagement with said adjacent portions respectively, the position of said lens while being so impressed being such that the optical axis thereof is substantially normal to said plane and passes between said surfaces, and holding said lens in such position until a cylinder is formed on the convex surface thereof.

8. The method of forming a cylinder on a corneal contact lens having a convex external surface comprising the steps of moving two surfaces which are disposed adjacent to each other in predetermined directions, portions of said surfaces being immediately adjacent, said surfaces being resiliently deformable, impressing the convex surface of a contact lens into said immediately adjacent portions such that opposite diametral portions of said convex surface are in engagement therewith, said immediately adjacent portions extending substantially parallel to each other, the portions which are parallel being substantially straight for a distance equal to the length of a cylinder to be formed on said convex surface, said straight portions having a gap therebetween, the diametral portions of said lens being positioned on opposite sides respectively of said gap, holding said lens against rotation and in a position in which the optical axis thereof extends in a direction substantially perpendicular to said straight portions, thereby forming a cylinder on said lens between said diametral portions.

(References on following page)

References Cited by the Examiner

UNITED STATES PATENTS

| | | | |
|---|---|---|---|
| 984,464 | 2/1911 | Bestgen | 51—140 |
| 1,065,600 | 6/1913 | Euchenhofer et al. | 51—80 X |
| 2,237,744 | 4/1941 | Mullen. | |
| 2,437,436 | 3/1948 | Mullen | 51—284 |
| 2,990,664 | 7/1961 | Cepero | 51—284 |
| 3,031,927 | 5/1962 | Wesley | 88—54.5 |
| 3,118,225 | 1/1964 | Dipprey et al. | 51—55 |

FOREIGN PATENTS 908,872  10/1962  Great Britain.

LESTER M. SWINGLE, *Primary Examiner.*

D. H. RUBIN, *Examiner.*